United States Patent [19]
Fischer

[11] 3,826,101
[45] July 30, 1974

[54] PLATE DEFROSTING SYSTEM UTILIZING DEFROSTING LIQUID FROM A VEHICLE ENGINE

[75] Inventor: Harry C. Fischer, Royal Oak, Md.
[73] Assignee: Dale Refrigerating Company, Chicago, Ill.
[22] Filed: June 26, 1973
[21] Appl. No.: 373,667

[52] U.S. Cl............. 62/82, 62/156, 62/243, 62/282, 62/439
[51] Int. Cl............................. F25d 21/12
[58] Field of Search....... 62/82, 151, 156, 243, 244, 62/282, 323, 439; 165/17

[56] References Cited
UNITED STATES PATENTS
2,859,945 11/1958 Kleist.................................. 62/439
2,957,317 10/1960 Parker................................. 62/243
2,986,014 5/1961 Schelling............................. 62/82
3,042,381 7/1962 Lasak.................................. 62/282

*Primary Examiner*—Meyer Perlin
*Attorney, Agent, or Firm*—Kinzer, Plyer, Doran & McEachran

[57] ABSTRACT

A vehicle refrigeration system uses an eutectic holdover refrigeration plate unit containing plates with internal defrosting coil. The defrosting coils are supplied with coolant from the vehicle engine system, at the desire of the operator, with the supply of engine coolant being terminated automatically at a predetermined temperature.

12 Claims, 2 Drawing Figures

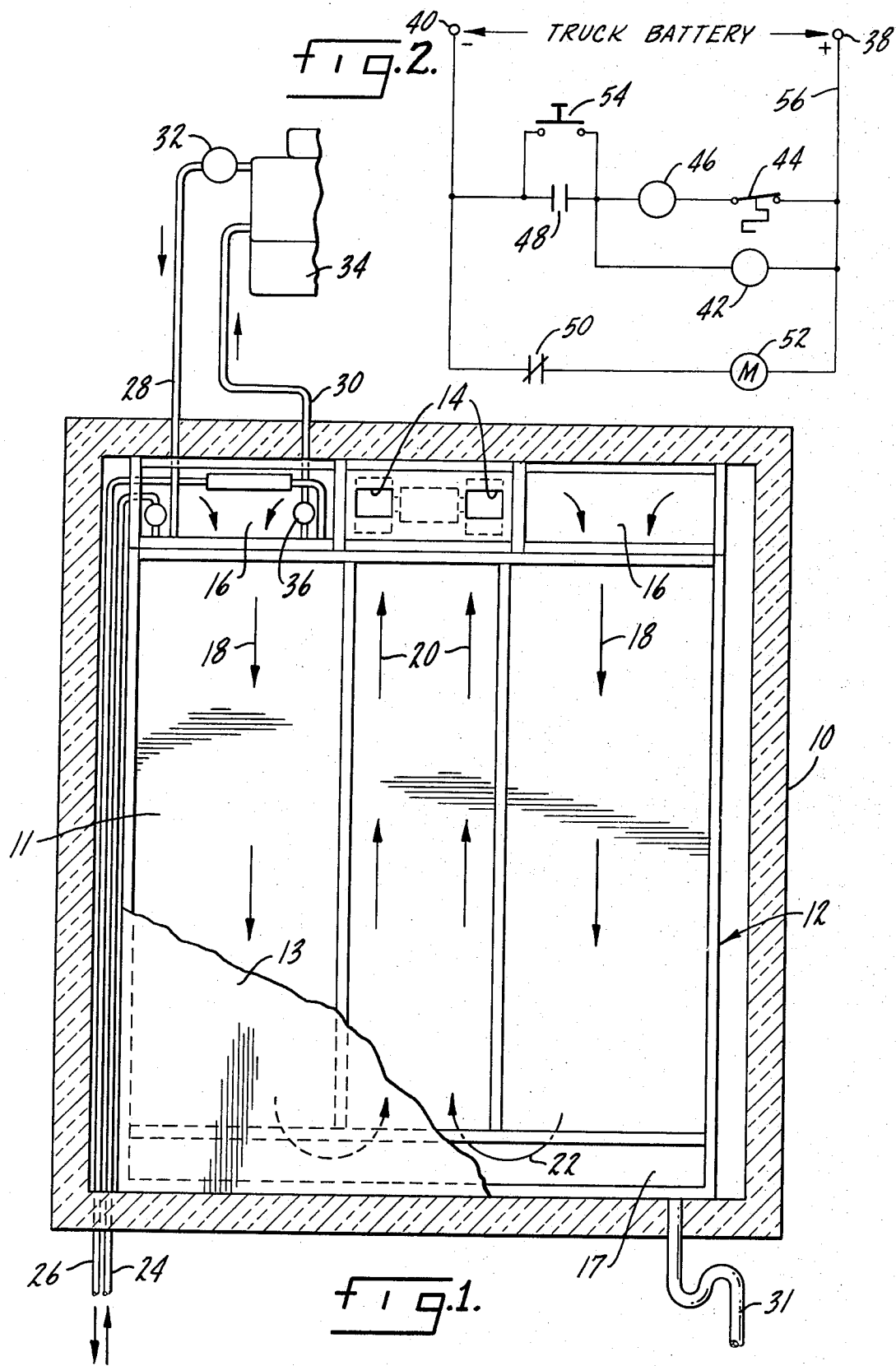

PLATE DEFROSTING SYSTEM UTILIZING DEFROSTING LIQUID FROM A VEHICLE ENGINE

SUMMARY OF THE INVENTION

The present invention relates to a defrosting system for a vehicle eutectic holdover refrigeration plate and has particular reference to such a system in which the vehicle engine coolant is used as the defrosting medium.

A primary purpose of the present invention is a defrosting system of the type described in which initiation of the defrost cycle is made by the operator with the termination of the cycle being determined by the temperature of the coolant returned to the vehicle engine system.

Another purpose is a method of defrosting a vehicle refrigeration system utilizing engine coolant.

Another purpose is a reliably operable simply constructed eutectic holdover plate refrigeration system utilizing vehicle engine coolant as a defrosting medium.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a refrigeration plate defrosting system, and FIG. 2 is an electrical diagram of the control means for the defrosting system.

DESCRIPTION OF THE PREFERRED EMBODIMENT

U.S. Pat. No. 2,831,328 discloses a dual circuit eutectic plate having a refrigerant coil and a defrosting coil. This general arrangement is utilized herein, although there may be differences in plate construction relative to the position and disposition of the coils. Nevertheless, the plate shown herein may be generally similar to that of the patent. The present invention is particularly concerned with a means for supplying a defrosting medium to the defrost coils.

In FIG. 1, the general outline of a vehicle body is indicated at 10 and a plate unit 12 may be positioned within the vehicle body. The plate unit, as indicated above, may vary. In one form there may be a series of individual eutetic plates 11 arranged in a side-by-side manner within a closed cover 13. A blower is postioned behind a pair of blower openings 14 so as to blow air out into the space to be cooled. Air intakes are indicated at 16 and the air may be drawn in, adjacent the upper portion of the space to be cooled, and may then follow a downward path, as indicated by arrows 18, toward a space 17 at the bottom of the closed cover 13. The return path of the air is indicated at 20, and the arrows 22 indicate the path of the air as it changes from a downward direction to an upward direction. Air to be cooled is circulated about the eutectic plates before it is moved out through the openings 14 into the space to be cooled. Within the eutectic plates, there are refrigerant coils. The input line to the refrigerant coils is indicated at 24, with the output line being indicated at 26. The input and output lines may be suitably arranged to be supplied with a liquid refrigerant, such as refrigerant 502, 12, or any other suitable refrigerant medium which is satisfactory to freeze the eutectic within the plates.

In addition to the refrigerant coils within the plates, there are defrosting coils which may be disposed in the manner of the above-mentioned patent. The input line for the defrosting coils is indicated at 28, with the output line being indicated at 30. A solenoid valve 32 is positioned closely adjacent the diagrammatic vehicle engine 34, and the lines 28 and 30 will be connected to the vehicle coolant system. A thermostat 36 is positioned in the output line 30 closely adjacent the plate unit 12. Thus, when the valve 32 is opened, coolant will be supplied from the vehicle engine coolant system to the defrosting coils through line 28 to defrost the eutectic plate. After the coolant returning to the engine coolant system has reached a predetermined temperature, as established by the thermostat 36, the valve 32 will close, as described hereinafter. The requirements for the engine coolant system are flexible, although obviously the coolant should remain in a liquid state down to a temperature at least as low as 20° below zero. Ethylene glycol or other suitable forms of antifreeze or coolant, commonly used in vehicle systems, are all satisfactory. The structure may be completed by a drain 31 for removing water after the defrosting operation.

In FIG. 2 the positive and negative terminals of the vehicle battery are indicated at 38 and 40, respectively. A solenoid coil 42 controls operation of valve 32 and electrical switch arm 44 is a part of the thermostat 36. A relay coil is indicated at 46 and controls normally open relay contacts 48 and normally closed relay contacts 50. The blower motor is indicated at 52, as normally the blower is placed in an off condition during the defrosting cycle. A pushbutton switch 54 is indicated in the circuit and normally this switch will be available in the cab of the vehicle operator.

In operation, when the operator desires to initiate the defrost cycle, which will normally be when he is returning back after completion of the delivery of cooled products, such as milk, frozen food or the like, he momentarily depresses pushbutton switch 54 which places relay coil 46 across the terminals of the battery, presuming the thermostat is closed indicating a temperature where defrost may be necessary. Contacts 48 will close and contacts 50 will open. The opening of contacts 50 terminates operation of the blower motor. When contacts 48 close, relay 46 will be latched in and solenoid coil 42 will be connected across the battery terminals to hold valve 32 open and supply engine coolant to the eutectic plate. The system will remain in this condition as long as the thermostatic switch arm 44 is closed. When the temperature of the coolant returning to the vehicle engine reaches a predetermined level, indicating that the defrost cycle has been completed, switch arm 44 will move to an open position and deenergize relay coil 46. Contacts 48 open and contacts 50 close, opening the circuit to solenoid coil 42, thus stopping the flow of engine coolant to the plates and allowing the blower motor to restart.

Optionally, a relay, whose coil is energized from the accessory terminal on the truck ignition switch, may be installed in line 56. Then if for any reason defrost termination is required prior to the normal temperature terminate sequence, the driver need only turn the vehicle ignition switch off and termination will be accomplished.

Normally, the time to complete the defrost cycle will be on the order of about 10–30 minutes, depending upon the size of the vehicle engine, ambient temperature, amount of frost to be removed, and amount of frozen eutectic in the plates. As a general rule, there is approximately 42 BTU per minute per brake horsepower available for defrosting from the heat of the vehicle engine. A 50-brake horsepower vehicle engine can provide approximately 126,000 BTU per hour for defrosting.

Although the invention has been described as utilizing a thermostat in the return line for the engine coolant, it is equally satisfactory to place a thermostat on the surface of a plate in order to determine when the defrost cycle has been completed.

Whereas the preferred form of the invention has been shown and described herein, it should be realized that there may be many modifications, substitutions and alterations thereto.

The embodiments of the invention in which an exclusive property or privilege is claimed are as follows:

1. In a vehicle refrigeration system, an eutectic refrigeration plate unit, coil means in said plate unit for passing a refrigerant therethrough, a cover for said plate unit and means for moving air from the area of the plate unit to a space to be cooled,
   means for defrosting said plate unit including coil means in said plate unit, means connecting said coil means with the vehicle engine coolant system, valve means controlling the flow of coolant from the engine to said defrost coil means and temperature sensing means for closing said valve.

2. The structure of claim 1 further characterized in that said temperature sensing means includes a thermostat for sensing the temperature of the engine coolant as it returns from the plate unit to the engine.

3. The structure of claim 2 further characterized in that said thermostat is closely adjacent the plate unit.

4. The structure of claim 1 further characterized in that said valve means is a solenoid valve positioned closely adjacent the vehicle engine.

5. The structure of claim 1 further characterized by and including electric control means connecting said valve means and temperature sensing means.

6. The structure of claim 5 further characterized in that said control means includes an electric circuit, a switch in said electric circuit for causing said valve means to open, said temperature sensing means being effective to close said valve means.

7. The structure of claim 6 further characterized in that said air moving means is in said electric circuit.

8. The structure of claim 7 further characterized by and including means for terminating operation of said air moving means when said valve means is opened.

9. A method of defrosting an eutectic refrigeration plate used in a vehicle refrigeration system, including the steps of supplying coolant from the vehicle engine cooling system to coils within the eutectic refrigeration plate, and terminating the application of engine coolant at a predetermined temperature.

10. The method of claim 9 further characterized by the step of initiating the supply of coolant from the vehicle engine as desired by the operator.

11. The method of claim 10 further characterized in that the supply of engine coolant is terminated at such time as the returning engine coolant reaches a predetermined temperature.

12. A method of defrosting an eutectic refrigeration plate used in a vehicle refrigeration system, including the steps of supplying coolant from the vehicle engine cooling system to coils within the eutectic refrigeration plate for defrosting the plate, and terminating the application of engine coolant when defrosting has been completed.

* * * * *